United States Patent [19]

Farr

[11] 3,886,746
[45] June 3, 1975

[54] POWER ASSISTED MASTER CYLINDER ASSEMBLIES

[75] Inventor: Glyn Phillip Reginald Farr, Kenilworth, England

[73] Assignee: Girling Limited, Birmingham, England

[22] Filed: Nov. 28, 1973

[21] Appl. No.: 419,662

[30] Foreign Application Priority Data
Nov. 30, 1972 United Kingdom............... 55397/72
Feb. 20, 1973 United Kingdom................. 8177/73

[52] U.S. Cl. .................. 60/547; 60/534; 60/561
[51] Int. Cl. ... F15b 15/18; B60f 17/06; B60r 25/08
[58] Field of Search ............ 60/534, 535, 545, 547, 60/549, 552, 555, 560, 561, 562, 566; 158/358, 359

[56] References Cited
UNITED STATES PATENTS

| | | | |
|---|---|---|---|
| 2,662,377 | 12/1953 | Miller | 60/566 |
| 3,319,421 | 5/1967 | Kawabe | 60/552 |
| 3,434,285 | 3/1969 | Hager | 60/561 |
| 3,434,286 | 3/1969 | Raizes | 60/535 |

Primary Examiner—Martin P. Schwadron
Assistant Examiner—H. Burks, Sr.
Attorney, Agent, or Firm—Scrivener, Parker, Scrivener and Clarke

[57] ABSTRACT

In a power-assisted tandem master cylinder assembly a valve assembly controls the power assistance in response to the pressure generated in each of the pressure spaces of the master cylinder and is located either alongside the master cylinder or remote from the master cylinder.

5 Claims, 3 Drawing Figures

POWER ASSISTED MASTER CYLINDER ASSEMBLIES

This invention relates to power-assisted master cylinder assemblies of the kind in which the primary piston of a tandem master cylinder is adapted to be applied, at least partially, by fluid under pressure.

According to this invention a master cylinder assembly of the kind set forth includes a control valve assembly for controlling a supply of fluid under pressure to assist the tandem master cylinder, the control valve assembly being responsive to pressure generated in each of the pressure spaces of the master cylinder.

Preferably the control valve assembly and the master cylinder are separate units arranged side-by-side in an integral assembly though they may be kept separate and connected by external hoses. The advantage of either arrangement is that the master cylinder is not substantially longer than a normal tandem master cylinder, whereas in many cases a tandem master cylinder incorporating a booster is inconveniently long, being especially inconvenient when the assembly is intended for mounting on the bulkhead of a vehicle.

The control valve assembly incorporates a control piston for actuating a valve or valves and may also incorporate in the same housing a spool for separating the outputs from the tandem master cylinder. The spool may also be arranged to actuate a warning indicator in the event that there is a pressure difference between the master cylinder outputs.

The control valve assembly may be arranged to control an open or closed center hydraulic pressure supply or a supply of compressed air.

Figure 1:
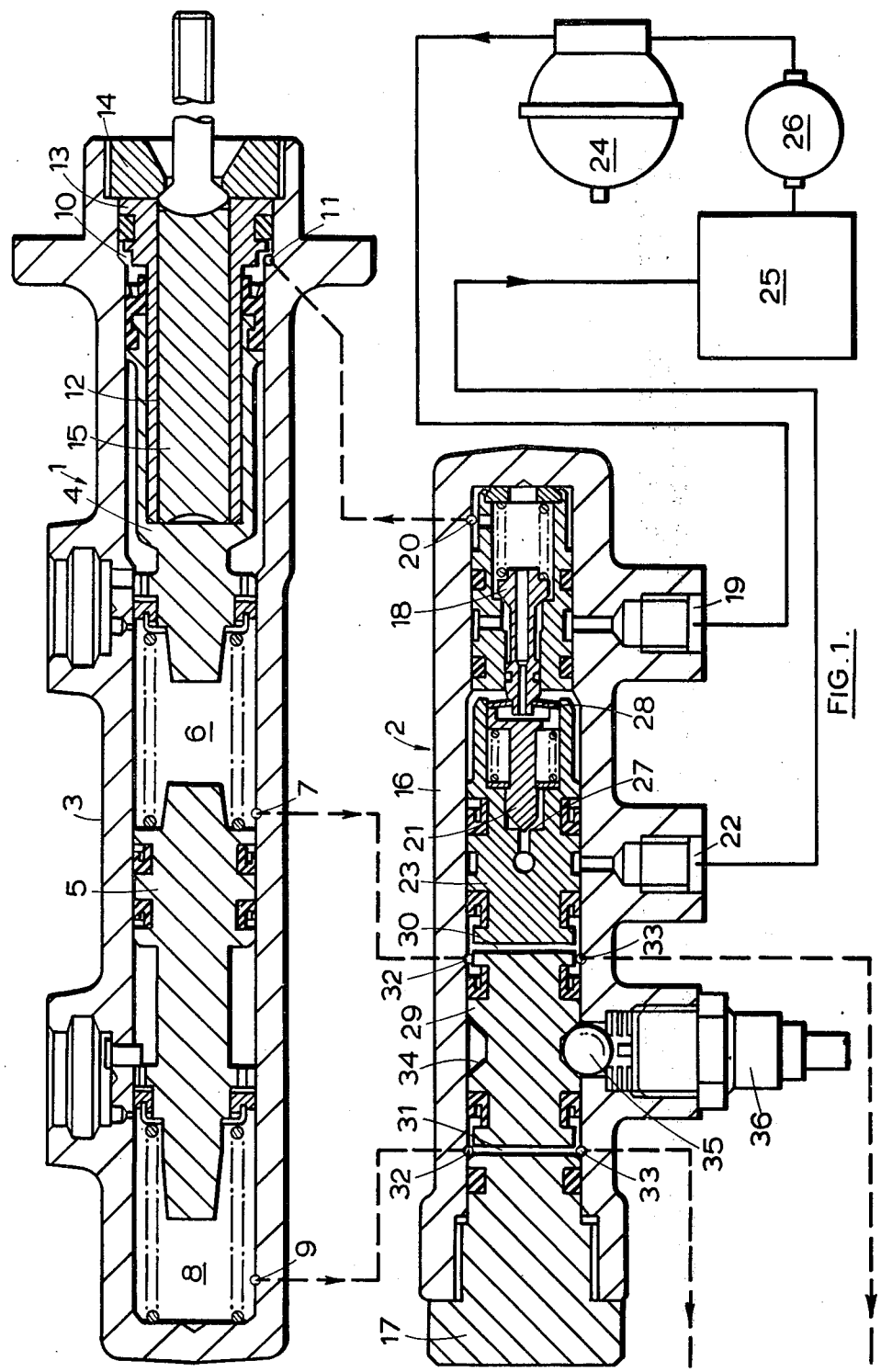
Figure 2:
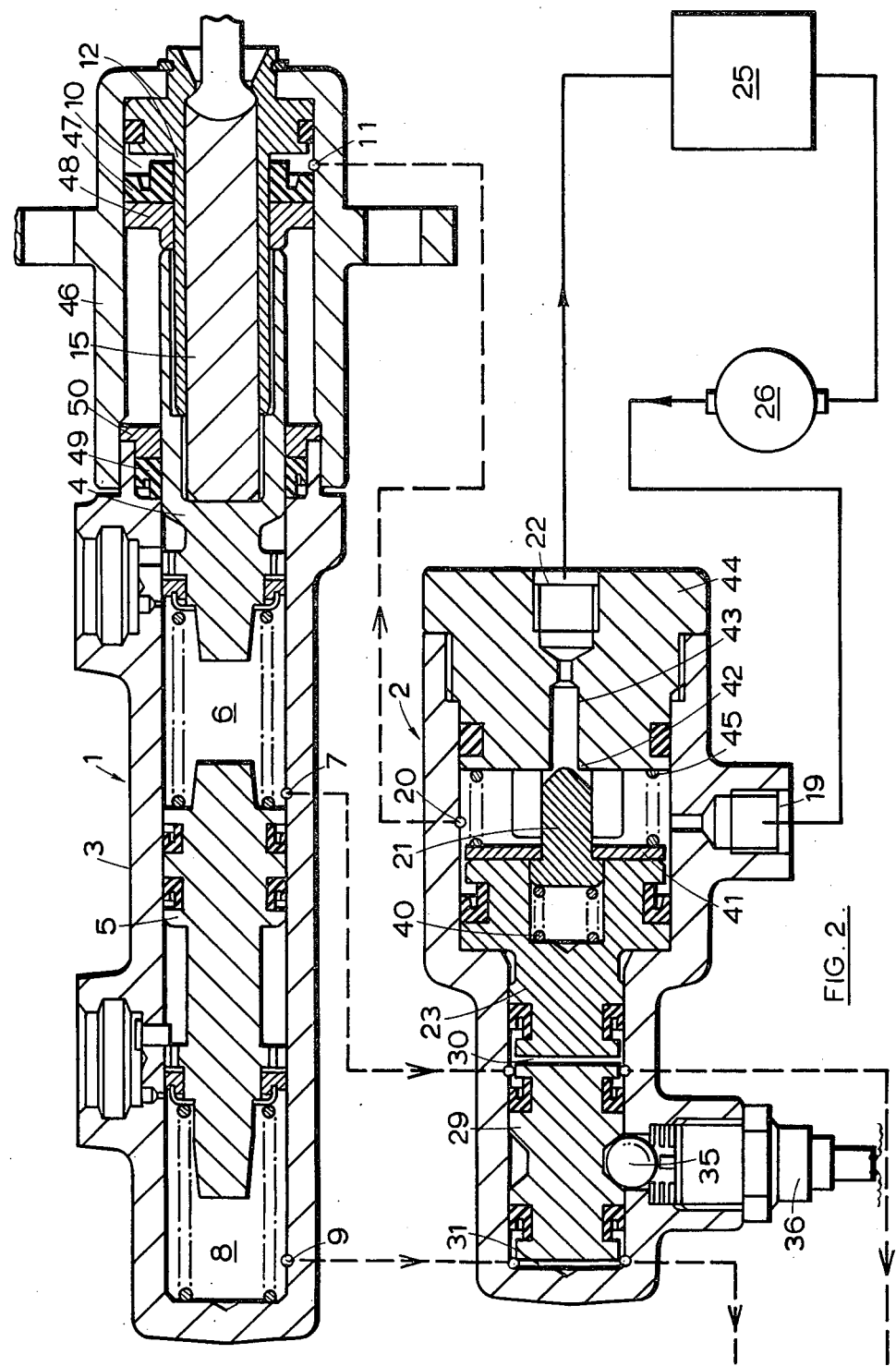
Figure 3:
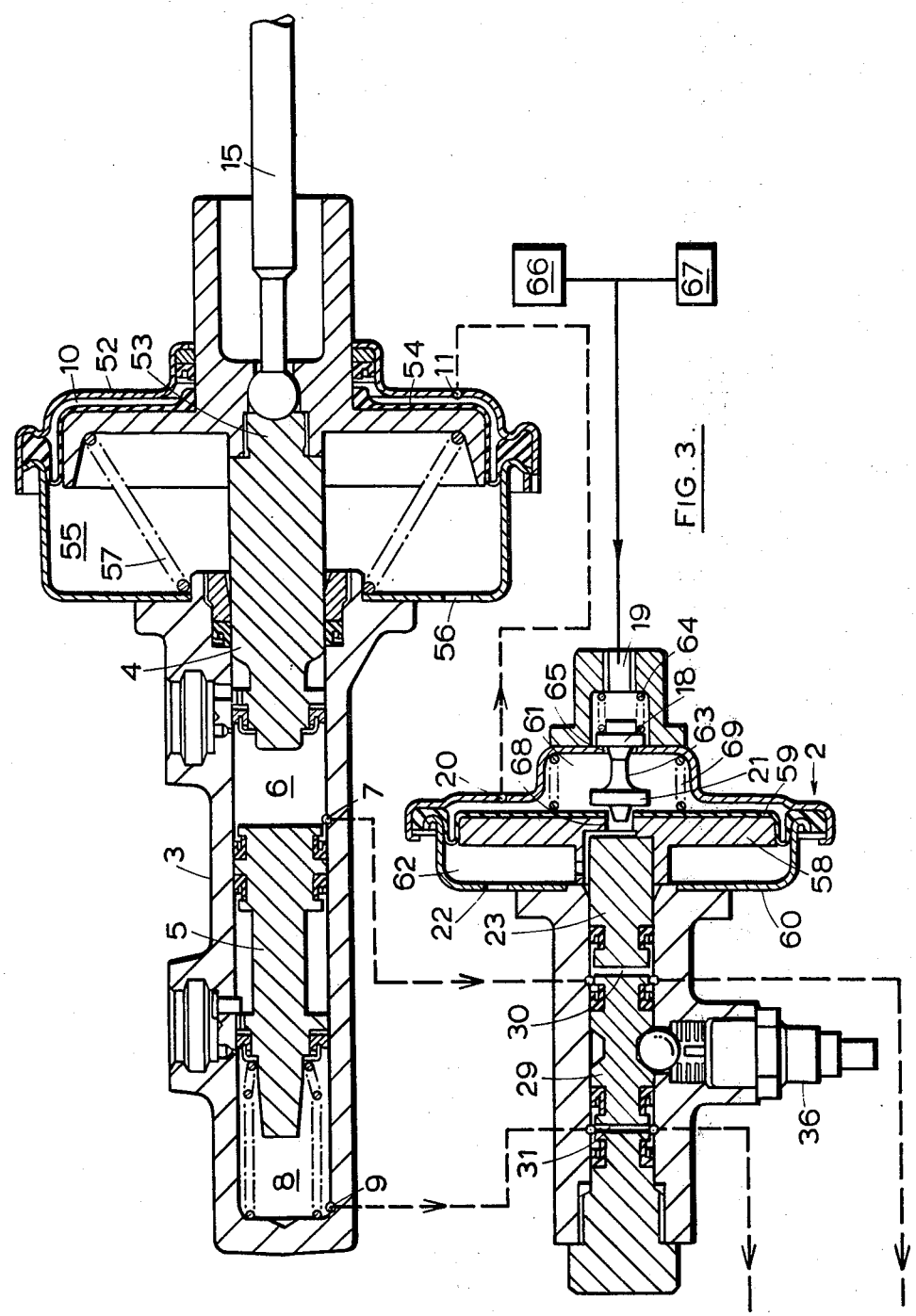

Three embodiments of master cylinder assemblies according to this invention are illustrated in FIGS. 1-3 of the accompanying drawings.

FIG. 1 shows a master cylinder assembly comprising a tandem hydrostatic master cylinder 1 and a control valve assembly 2. The body 3 of the master cylinder has a blind, stepped bore in which works a stepped primary pedal-operated piston 4 and a secondary floating piston 5, a first pressure space 6 having an outlet 7 being defined between the two pistons and a second pressure space 8 having an outlet 9 being defined between the second piston and the end of the bore. A power chamber 10 having an inlet 11 is arranged behind the primary piston 4, which is recessed to slidingly receive a sleeve 12 having a radial flange 13 held in the bore by a screwed plug 14. A pedal-operated rod 15 is arranged to engage the piston 4 through the sleeve so that the rod is sealed from fluid in the power chamber.

The body 16 of control valve assembly 2 also has a blind bore, the open end of which is closed by a plug 17. At the blind end of the bore is located a spring-loaded inlet valve 18 controlling the flow of fluid from inlet port 19 to an outlet 20 connected to the power chamber 10, and a spring-loaded exhaust valve 21 controlling communication between the outlet and an exhaust port 22. The inlet and exhaust valves are actuated by a control piston 23 and the inlet and exhaust ports are adapted to be connected respectively to an accumulator 24 and a reservoir 25 for a pump 26 of a closed center pressure supply. The control piston 23 includes a seating 27 for the exhaust valve 21 and is resiliently connected to the inlet valve 18 by a Belleville washer 28.

A spool 29 is located between piston 25 and plug 17, a first balance chamber 30 being defined between the spool and the piston and a second balance chamber 31 being defined between the spool and the plug. Each chamber has an inlet 32 connected to the corresponding space in the master cylinder, and an outlet 33 for connection to a separate brake circuit. An intermediate peripheral groove 34 in the spool 29 locates a ball 35 which is moved outwardly on axial movement of the spool to operate a switch 36 of a warning circuit. Spool 29 is self-centering.

In operation, when the brake pedal is depressed, hydraulic fluid in the pressure spaces 6 and 8 is delivered by way of chambers 30 and 31 to two separate brake circuits. Pressure in either of chambers 30, 31 causes movement of control piston 23 to allow pressure fluid from accumulator 24 into power chamber 10 to boost the output from spaces 6 and 8.

When a pressure balance is achieved and the fluid pressures in the balance chambers 30, 31 equal the pressure in the control valve assembly, then the load applied to the pedal equals the fluid pressure acting over the differential area of piston 4. At the balance point the inlet valve 18 closes, its spring loading overcoming the stress in Belleville washer 28. If the pedal load is reduced, the pressure in the primary pressure space 6 drops and the control piston 23 moves rearwardly to open the exhaust valve 21 and restore the pressure balance. Thus the driver of the vehicle continuously feels a pedal reaction proportional to the braking effort.

If there is a failure in the primary brake circuit, then the primary piston 4 picks up the secondary piston 5 to supply fluid to chamber 31 in the control valve assembly. Spool 29 moves to the right to pick up piston 23. The movement of spool 29 operates switch 36 to light a lamp or other warning device.

If the secondary brake circuit fails, the secondary piston 5 must engage the end of the master cylinder before pressure is generated in spaces 6 and 30. This pressure moves spool 29 to the left and piston 23 to the right, operating the pressure differential warning and the valve mechanism.

The master cylinder assembly of FIG. 2 is similar to that of FIG. 1 and equivalent parts have been give the same reference numerals. However the control valve assembly 2 has been modified for use with an open center power supply in which pump 26 continuously pumps fluid through inlet port 19 to power chamber 10 and to reservoir 25 via exhaust port 22. In this arrangement only the exhaust valve 21 is required to shut off the reservoir return and allow pressure to build up. Control piston 23 is stepped and has a recess in its wider diameter end housing a spring 40 which urges the headed end of valve member 21 into abutment with a retaining plate 41. The valve member 21 co-operates with a seating 42 at the end of an axial passage 43 in an end plug 44 containing exhaust port 22. Plate 41 is held against piston 23 by a spring 45 acting between plate 41 and plug 44.

The master cylinder of FIG. 2 has also been modified slightly by making it in two parts, a forward part 3 containing both pressure spaces and a rear part 46 of greater diameter housing the power chamber 10. The piston 4 has also been formed in two parts, the rearmost seal 47 being supported by a separate ring 48 abutting the end of the piston. The forward seal 49 is held stationary between the step at the change of bore diameter and a ring 50 fixed between the two cylinder parts 3 and 46.

The assembly of FIG. 2 operates in the same way as that of FIG. 1.

In FIG. 3 the master cylinder assembly of FIG. 1 has been modified for use with compressed air. Again the same reference numerals have been used for equivalent parts. It will be seen that the power chamber 10 of the master cylinder is the high pressure chamber of an air-suspended diaphragm booster. The pedal-operated rod 15 acts through a sleeve 51 sealingly engaging the edge of an opening in a booster housing 52. The end of the rod 15 engages an extension 53 of the primary piston 4 which is screwed to the sleeve. Inside the housing 52 the sleeve carries a flexible diaphragm 54 dividing the housing into the power chamber 10 and a low pressure chamber 55 having an exhaust port 56. A spring 57 biasses the sleeve to the "off" position.

In the control valve assembly 2 the piston 23 acts on a seating member 58 carrying a diaphragm 59 dividing the valve housing 60 into a high pressure chamber 61 and a low pressure chamber 62. The inlet valve 18 and exhaust valve 21 are formed as the two headed ends of a single valve member 63. The inlet valve 18 is loaded by a spring 64 into engagement with a seating surrounding an opening 65 into the high pressure chamber, the valve member extending through the opening 65. The inlet port 19 is connected to a pressure vessel 66 and air compressor 67. The exhaust valve 21 co-operates with a seating surrounding a passage 68 through the seating member 58 which is biassed away from the valve member 63 by a spring 69.

In operation when the brake pedal is depressed hydraulic fluid in the pressure spaces 6 and 8 is delivered by way of chambers 30 and 31 to two separable brake circuits. Pressure in either of chambers 30, 31, causes control piston 23 to move the seating member 58 to the right to close the exhaust valve 21 and open inlet valve 18. Air from reservoir 66 is admitted to the power chamber 10 via ports 19, 20, 11 to boost the pedal effort applied to piston 4. When the brake pedal is released, inlet valve 18 shuts and exhaust valve 21 opens venting the high pressure chamber 61 and power chamber 10 to atmosphere through exhaust port 22, thus metering compressed air to the pwer chamber to maintain a pressure balance.

The master cylinder assemblies described are intended for use in L split braking systems i.e. systems in which each braking circuit operates an actuator on each front wheel and one rear wheel, each front wheel brake having two separate actuators. Should either of the brake circuits fail the system will alow 50% of normal braking for a given pedal effort. Should the power supply fail, then assuming a 3:1 boost ratio, the system will allow 100/3 or 33⅓% of normal braking for a given pedal effort.

I claim:

1. A power-assisted master cylinder assembly comprising a master cylinder which includes a cylinder body, a primary and a secondary piston arranged in tandem in said body, a primary and a secondary pressure space being defined ahead of said primary and said secondary piston respectively, an outlet from each of said pressure spaces for connection to a primary and secondary brake circuit respectively, a power chamber in said cylinder body behind said primary piston and an inlet to said power chamber for connection to a source of fluid under pressure; and a control valve assembly which includes valve means for controlling the supply of fluid from said source to said power chamber, and means for operating said valve means in response to three conditions; firstly to pressure in both of said primary and secondary pressure spaces when both brake circuits are operational, secondly to pressure in said secondary pressure space in the event of a failure of said primary circuit, and thirdly to pressure in said primary space in the event of a failure of said secondary circuit.

2. A power-assisted master cylinder assembly as in claim 1 wherein said master cylinder and said control valve assembly are separate units but connected by fluid connections.

3. A power-assisted master cylinder assembly as in claim 1, wherein said valve operating means comprises a housing having a bore closed at one end, a spool and a control piston working in tandem in said bore with said spool adjacent said closed end of said bore, said control piston being arranged to actuate said valve means upon axial movement away from said closed end of said bore, said spool and said closed end of said bore defining therebetween a first balance chamber, and said spool and said control piston defining therebetween a second balance chamber, means for connecting each of said chambers to a different one of said outlets to place said chambers in communication with said pressure spaces, and stop means in said bore for limiting axial movement of said spool away from said control piston, whereby the control piston is actuated in response to said first condition by the pressure of fluid in said second balance chamber, in response to another of said conditions by the pressure of fluid in said second balance chamber which also holds said spool against said stop means, and in response to the remaining one of said conditions by the pressure of fluid in said first balance chamber acting through said spool which engages with said control piston.

4. A power-assisted master cylinder as in claim 3, wherein said stop means comprises a surface at the closed end of said bore for engagement by the spool, said control piston having a surface at its end adjacent to said spool for engagement by the spool, said spool having an axial length only slightly less than the axial distance between said engagement surfaces, whereby upon failure of one brake circuit a minimum volume of fluid is required to be supplied to the balance chamber connected to the other circuit to move said spool into contact with one of said engagement surfaces before full pressure can be developed in that balance chamber to displace the control piston to actuate the valve means.

5. A power-assisted master cylinder as in claim 3, wherein said valve operating means is provided with means for biassing said spool to an intermediate axial position in which the spool is spaced from said stop means and said control piston, said spool being arranged to actuate a differential pressure warning indicator responsive to displacement of said spool in either direction from said intermediate position.

* * * * *